US010829035B2

(12) United States Patent
Robertson

(10) Patent No.: US 10,829,035 B2
(45) Date of Patent: Nov. 10, 2020

(54) VEHICLES AND BUMPER ASSEMBLIES HAVING A STOWABLE LIGHTING ASSEMBLY

(71) Applicant: Toyota Motor Engineering & Manufacturing North America, Inc., Plano, TX (US)

(72) Inventor: Winston Robertson, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 4 days.

(21) Appl. No.: 16/259,343

(22) Filed: Jan. 28, 2019

(65) Prior Publication Data

US 2020/0238897 A1 Jul. 30, 2020

(51) Int. Cl.

| | |
|---|---|
| ***B60Q 1/00*** | (2006.01) |
| ***B60Q 1/26*** | (2006.01) |
| ***B60R 19/50*** | (2006.01) |
| ***F21V 21/26*** | (2006.01) |
| ***F21V 21/22*** | (2006.01) |
| ***B60Q 1/50*** | (2006.01) |

(52) U.S. Cl.

CPC ......... *B60Q 1/2657* (2013.01); *B60Q 1/2661* (2013.01); *B60Q 1/50* (2013.01); *B60R 19/50* (2013.01); *F21V 21/22* (2013.01); *F21V 21/26* (2013.01)

(58) Field of Classification Search

CPC .......... B60Q 1/02; B60Q 1/26; B60Q 1/2657; B60Q 1/2692; B60Q 1/30; B60Q 1/2661; B60Q 1/50; B60Q 1/24; B60R 19/50; B60R 2019/505; B60R 19/483; F21V 21/22; F21V 21/26

See application file for complete search history.

(56) References Cited

U.S. PATENT DOCUMENTS

| | | | | |
|---|---|---|---|---|
| 3,487,359 A * | 12/1969 | McClintock | B60Q 1/2657 362/540 |
| 3,520,273 A * | 7/1970 | Daifotes | B60Q 1/2657 116/28 R |
| 3,998,285 A * | 12/1976 | Cooper | B60Q 1/30 116/28 R |
| 9,764,680 B2 | 9/2017 | Tamay | |
| 2014/0362598 A1* | 12/2014 | Racicot | B60Q 1/2657 362/542 |

FOREIGN PATENT DOCUMENTS

| | | |
|---|---|---|
| CN | 201283825 Y | 8/2009 |
| DE | 2448073 A1 | 4/1976 |
| DE | 102016108456 A1 | 11/2016 |
| GB | 163966 A | 5/1921 |
| JP | 2005299165 A | 10/2005 |

* cited by examiner

*Primary Examiner* — Y M. Quach Lee

(74) *Attorney, Agent, or Firm* — Dinsmore & Shohl LLP

(57) ABSTRACT

A bumper assembly includes a bumper and a stowable lighting assembly. The stowable lighting assembly includes a post and a lighting device. The post includes a proximal end and a distal end, wherein the proximal end is pivotably coupled to the bumper. The lighting device is pivotably coupled to the distal end of the post. The stowable lighting assembly is moveable between a stowed position and a deployed position, wherein the post positioned within or beneath the bumper in the stowed position.

18 Claims, 10 Drawing Sheets

20"
22"
164"
162"
110"
12

215
218
20
100
210
240
212
220
206
201
204
202
200

VEHICLES AND BUMPER ASSEMBLIES HAVING A STOWABLE LIGHTING ASSEMBLY

TECHNICAL FIELD

The present specification generally relates to lighting assemblies to illuminate an area of or around a vehicle and, more specifically, vehicles and bumper assemblies having a stowable lighting assembly for illuminating an area around and/or of a vehicle.

BACKGROUND

"Car" camping or tailgating is an activity that may include making a temporary kitchen near the rear of a vehicle. At night, multiple lights may be needed to illuminate the cooking, eating, and prep/clean up areas. However, lighting systems may be large and take up much-needed storage space within the vehicle.

Accordingly, a need exists for alternative lighting assemblies that allow for easy stowing and set up.

SUMMARY

In one embodiment, a bumper assembly includes a bumper and a stowable lighting assembly. The stowable lighting assembly includes a post and a lighting device. The post includes a proximal end and a distal end, wherein the proximal end is pivotably coupled to the bumper. The lighting device is pivotably coupled to the distal end of the post. The stowable lighting assembly is moveable between a stowed position and a deployed position, wherein the post positioned within or beneath the bumper in the stowed position.

In another embodiment, a bumper assembly includes a bumper defining a channel formed therein and a stowable lighting assembly. The stowable lighting assembly includes a post and a lighting device. The post includes a proximal end and a distal end, wherein the proximal end is pivotably coupled to the bumper. The lighting device is pivotably coupled to the distal end of the post. The stowable lighting assembly is moveable between a stowed position and a deployed position, wherein the post of the stowable lighting assembly is arranged in the channel when the stowable lighting assembly is positioned in the stowed position.

In yet another embodiment, a vehicle includes a bumper, a tail gate, and a stowable lighting assembly. The tail gate is configured to move between an open and closed position, wherein movement between the opened and closed positions defines a tail gate path. The stowable lighting assembly includes a post and a lighting device. The post includes a proximal end and a distal end, wherein the proximal end is pivotably coupled to the bumper. The lighting device is pivotably coupled to the distal end of the post. The stowable lighting assembly is moveable between a stowed position and a deployed position, wherein the post is positioned within or beneath the bumper when in the deployed position, and wherein the stowable lighting assembly is positioned outside of the tail gate path when in the deployed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
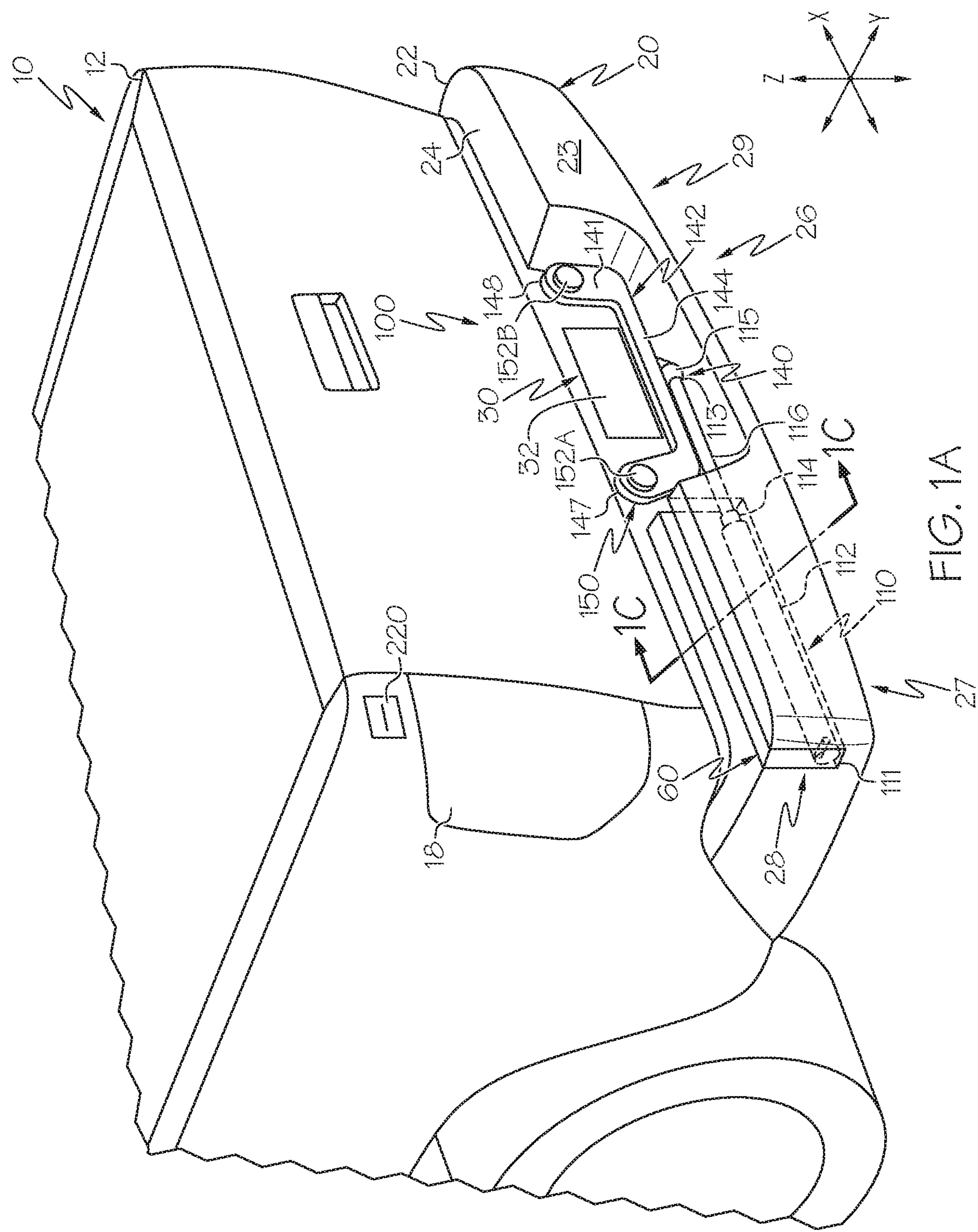
FIG. 1A depicts a perspective view of a rear bumper assembly of a vehicle with a stowable lighting assembly positioned in a stowed position, according to one or more embodiments shown and described herein.

Vehicles and bumper assemblies include a stowable lighting assembly, as will be described in greater detail herein. A bumper assembly may include a bumper and a stowable lighting assembly. The stowable lighting assembly may include a post that is pivotably coupled to the bumper and a lighting device pivotably coupled to the end of the post. The stowable lighting assembly is moveable between a stowed position and a deployed position. In the stowed position, the post of the stowable lighting assembly may be positioned within or beneath the bumper. By moving the stowable lighting assembly to a stowed position wherein the post is positioned within or beneath the bumper, the stowable lighting assembly may be stowed without taking up additional storage space within a cabin, trunk, or bed of the vehicle. Additionally, in embodiments, the lighting device may double as a license plate light, to provide illumination to the license plate of the vehicle when the lighting device is placed in a stowed position. These and additional features will be described in greater detail below with reference to the drawings.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted).

As used herein, the term "tail gate" refers to any door, lid, or gate hingedly attached to a vehicle above a bumper of a vehicle in the vehicle vertical direction to enclose or partially enclose a space (e.g., bed or trunk) of the vehicle.

Referring now to FIG. 1, a vehicle 10 is illustrated with a bumper assembly 20 coupled thereto. It is noted that while the vehicle 10 is depicted as an automobile, the vehicle 10 may be any passenger vehicle such as, for example, a terrestrial, aquatic, and/or airborne vehicle. Furthermore, while the bumper assembly 20 is illustrated as a rear bumper assembly, it is contemplated that the features described herein are also applicable to a front bumper assembly.

The bumper assembly 20 includes a bumper 22 coupled to the vehicle 10. The bumper 22 may extend from the vehicle 10 in the vehicle longitudinal direction and define a top surface 24. The bumper 22 may further include a laterally extending surface 23 that defines the longitudinal and lateral extents of the bumper 22. The bumper 22 may define a license plate recess 26 which defines a license plate mounting position 30. A license plate 32 may be mounted at the license plate mounting position 30 within the license plate recess 26. The license plate recess 26 may further define a first bumper wing 27 and a second bumper wing 29.

Figure 1B:
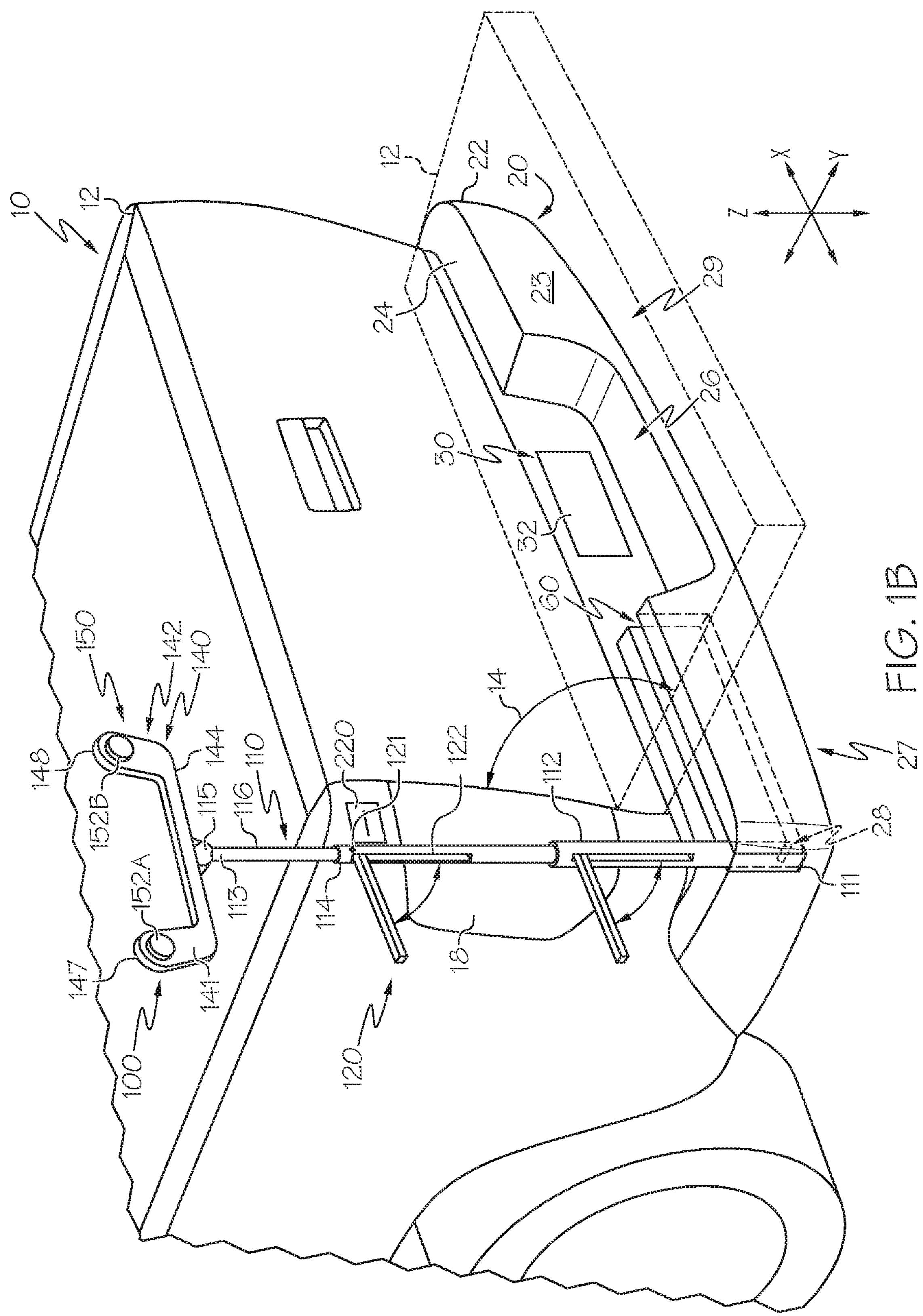
FIG. 1B depicts the stowable lighting assembly of FIG. 1A deployed to a deployed position, according to one or more embodiments shown and described herein.

The bumper assembly 20 further includes a stowable lighting assembly 100. The stowable lighting assembly 100 includes a post 110 and a lighting device 140 pivotably coupled to the post 110. As will be described in greater detail herein, the stowable lighting assembly 100 is moveable between a stowed position, such as shown in FIG. 1A, and a deployed position, such as shown in FIG. 1B where the stowable lighting assembly 100 is positioned in an upright position. When in the stowed position, the post 110 is folded to be positioned within or beneath the bumper 22. FIG. 1A illustrates an embodiment where the post 110 is positioned within the bumper 22 when the stowable lighting assembly 100 is in the stowed position.

The post 110 includes a proximal end 111 and a distal end 113, wherein the proximal end 111 is pivotably coupled to the bumper 22 at a bumper pivot connection 28. The bumper pivot connection 28 may include, but is not limited to, a pin connection, a hinge connection, or the like. By being pivotably coupled to the bumper 22, the post 110 can fold at the bumper pivot connection 28 so as to be stowed within or beneath the bumper 22. The post 110 may be made from any material capable of supporting the lighting device 140 when in the deployed position. For example, the post 110 may be made from metal, plastic, composites, wood, and combinations thereof. The post 110 may be of a hollow construction to provide a conduit for wiring of the lighting device 140 to pass therethrough.

In some embodiments, the post 110 may be a telescoping post. That is, the post 110 may include nested sections that can be extended or retracted relative to one another to shorten or lengthen the post 110. As illustrated in FIG. 1B, the post 110 may include a base section 112, a middle section 114 that is slidable within the base section 112, and a top section 116 which is slidable within the middle section 114. However, the post 110 may include any number of slidable sections without departing from the scope of the present disclosure. The slidable sections may lock into place using a post locking mechanism (not shown) such as a depressible button locks, twisting locks, brackets, friction fit, etc. In some embodiments, the post 110 may have multiple locks to allow the post 110 to be extended and locked at a variety of heights when in the deployed position.

In some embodiments, the post 110 may include one or more hangers 120 configured to support an object (e.g., bags, baskets, towels, tools, utensils, etc.) thereon. The one or more hangers 120 may be pivotably coupled to the post 110 and movable between a hanger stowed position and a hanger deployed position. In the hanger stowed positon, the one or more hangers 120 may be folded about a hanger pivot joint 121 against the post 110. In some embodiments, and as shown in FIG. 1B, the post 110 may include one or more hanger recesses 122. The one or more hanger recesses 122 may be sized and shaped to receive the one or more hangers 120 when they are pivoted to the hanger stowed position. That is, the one or more hangers 120 may be positioned within the one or more hanger recesses 122 so as not to extend beyond a body of the post 110 when in the stowed position. As shown in FIG. 1B, one or more of the slidable sections may include a hanger and hanger recess. In some embodiments, a slidable section may include multiple hangers 120 and hanger recesses 122.

As noted herein, coupled to the distal end 113 of the post 110 is the lighting device 140. The lighting device 140 is pivotably coupled to the distal end 113 of the post 110 by a lighting device joint 115. For example, the lighting device 140 may be pivotably coupled to the distal end 113 of the post 110 through a ball joint, for example. Accordingly, the lighting device 140 may be pivoted, swiveled, and tilted about the distal end 113 of the post 110 to move the lighting device 140 into a desired orientation to provide illumination of a region of and/or around the vehicle 10. The lighting device 140 may include a housing 142 that houses one or more lamps 150 coupled thereto. As shown in FIGS. 1A and 1B the housing 142 may be a generally u-shaped housing 142 having a base portion 144, a first extending portion 147 coupled to a first end of the base portion 144 and a second extending portion 148 coupled to a second end of the base portion 144. One or more lamps 150 may be positioned within each of the first extending portion 147 and the second extending portion 147. For example, and as shown in FIGS. 1A and 1B, a first lamp 152A may be coupled to the first extending portion 147 and a second lamp 152B may be coupled to the second extending portion 147. It is also contemplated that one or more lamps 150 may be coupled to the base portion 144. In some embodiments, one or more lamps 150 may be coupled to the edges and/or a back side of the housing 142, to allow light to be projected in multiple directions simultaneously. The one or more lamps 150 may be powered by a battery of the vehicle or a dedicated power source.

Figure 4:
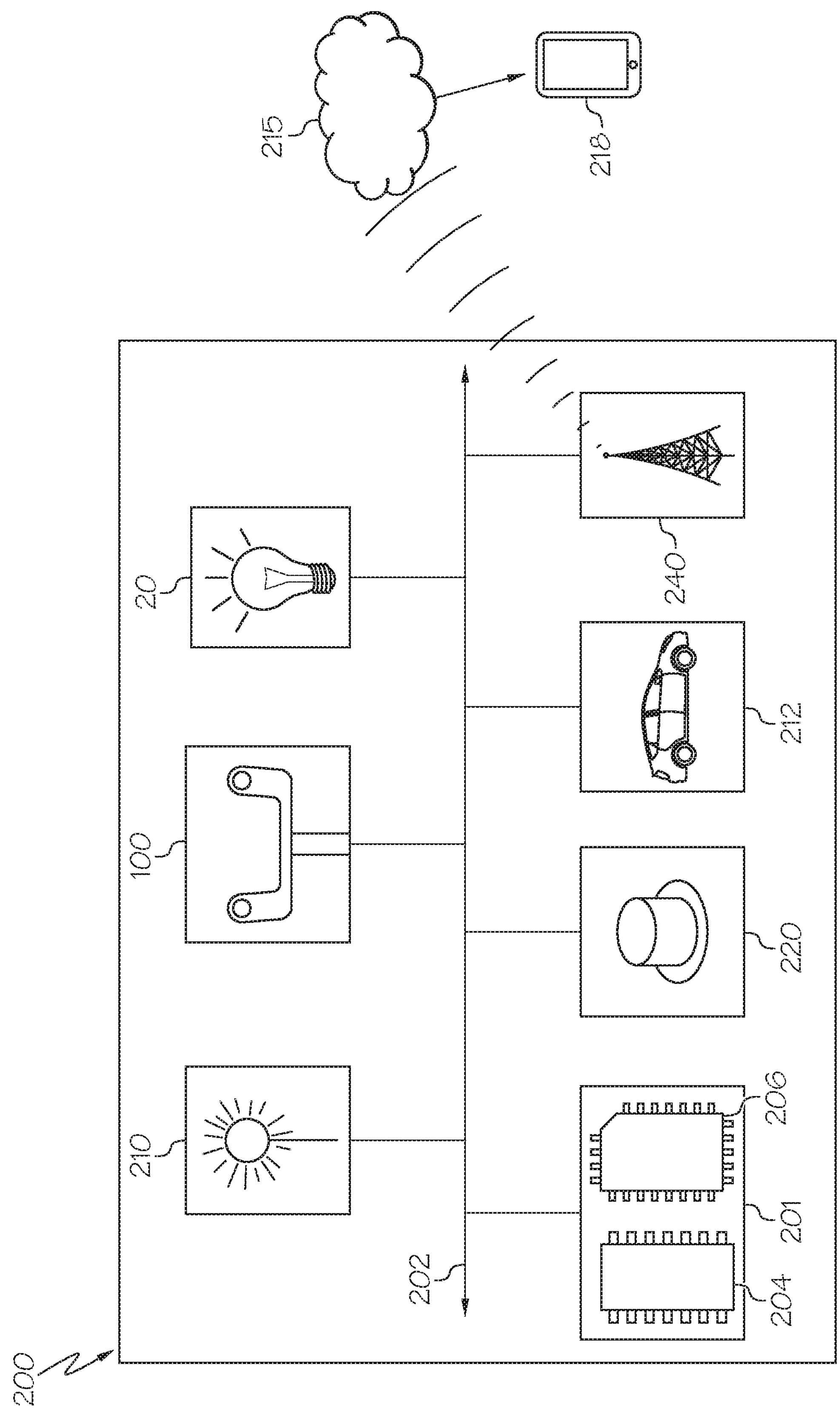
FIG. 4 schematically depicts a lighting control system, according to one or more embodiments shown and described herein.
Figure 5:
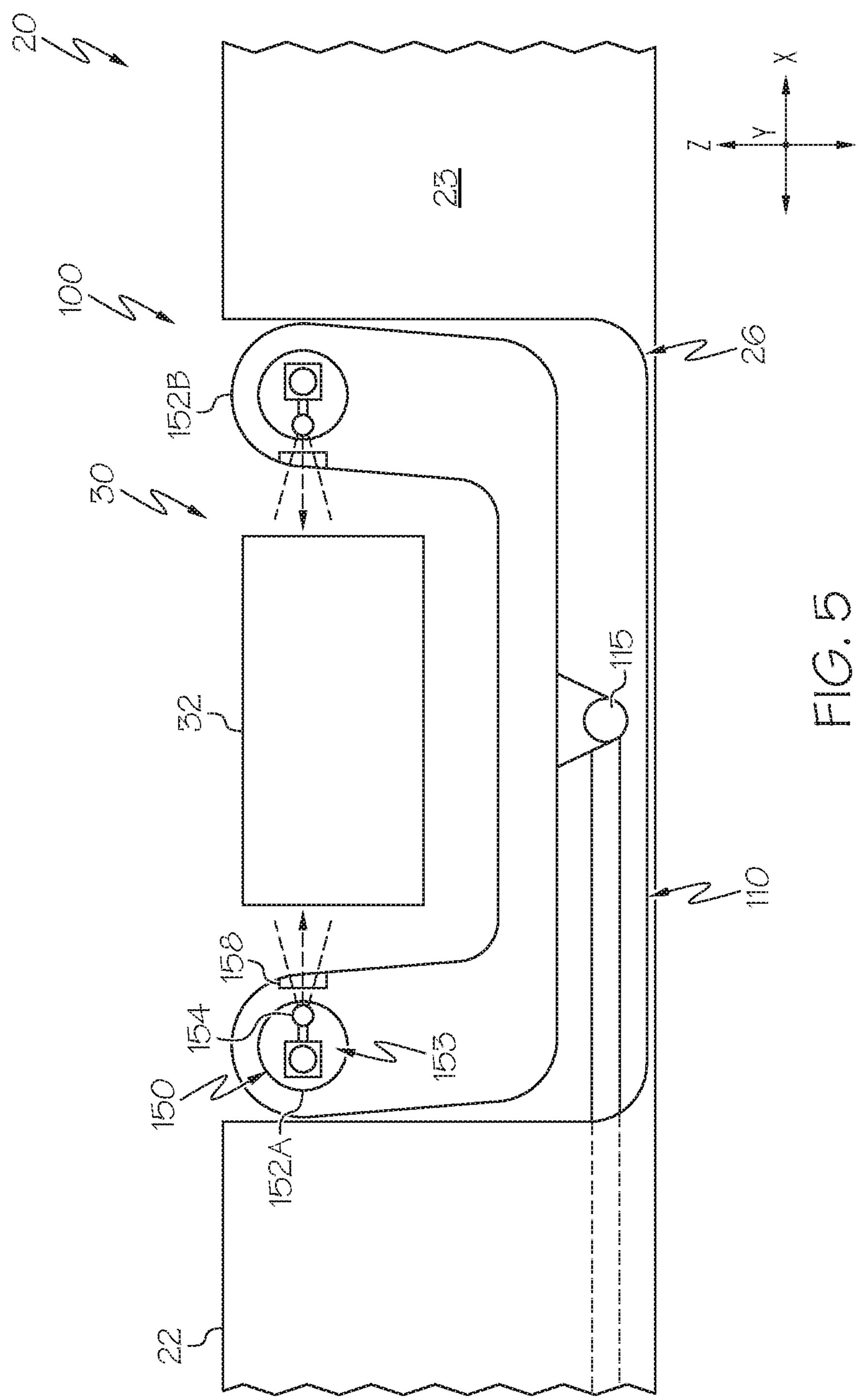
FIG. 5 depicts a detailed view of a lighting device, according to one or more embodiments shown and described herein.

Referring briefly to FIG. 5, each lamp 150 may include one or more light sources 153. Such light sources 153 may include but are not limited to halogen sources, high intensity discharge (HID) sources, light emitting diode (LED) sources, and the like. As will be described in greater detail, the light sources 153 may be controlled by an electronic control unit 201 (illustrated in FIG. 4) to adjust an illumination pattern of the lighting device 140. In some embodiments, the electronic control unit 201 may adjust the illumination pattern of the lighting device 140 from a first direction associated with the stowed position to a second direction associated with the deployed position when the electronic control unit 201 determines that the stowable lighting assembly 100 is moved to the deployed position. For example, when positioned in the stowed position, the lighting device 140 may be positioned within the license plate recess 26 as illustrated in FIG. 1B. From this position, it is contemplated that the illumination pattern of the lamps 150 may be adjusted to illuminate the license plate mounting position 30. Adjusting of the illumination pattern of the lamps 150 may include illuminating specific light sources to provide illumination in a desired direction. For example, when in the stowed position, the light sources 153 may include a plurality of bulbs, wherein bulbs configured to direct light toward the license plate (e.g., bulb 154) are illuminated. Accordingly, the illumination device may be used to illuminate a license plate 32 of the vehicle 10 when the stowable lighting assembly 100 is in the stowed position. When in the deployed position, the illumination pattern may be adjusted to a main illumination direction (e.g., in a direction perpendicular to a front face of the illumination device). In such case, light sources configured to direct light in the main illumination direction may be illuminated. In some embodiments, all light sources 153 of the stowable lighting assembly 100 may be illuminated when the stowable lighting assembly 100 is in the deployed position.

To facilitate stowing of the stowable lighting assembly 100, in some embodiments, the bumper 22 may have a channel 60 formed therein. For example, a channel 60 may be formed within the bumper wing with the stowable lighting assembly 100 coupled thereto (e.g., the first bumper wing 27). The channel 60 may extend through the top surface 24 of the bumper 22 into a body of the bumper 22 in the vehicle vertical direction and open into the license plate recess 26 in the vehicle lateral direction. As shown in FIG. 1A, at least a portion 147 of the post 110 may be positioned within the channel 60 when the stowable lighting assembly 100 is moved to the stowed position. Accordingly, a portion 147 of the post 110 may be hidden from view when viewing the bumper 22 along the vehicle 10 longitudinal direction.

Figure 1C:
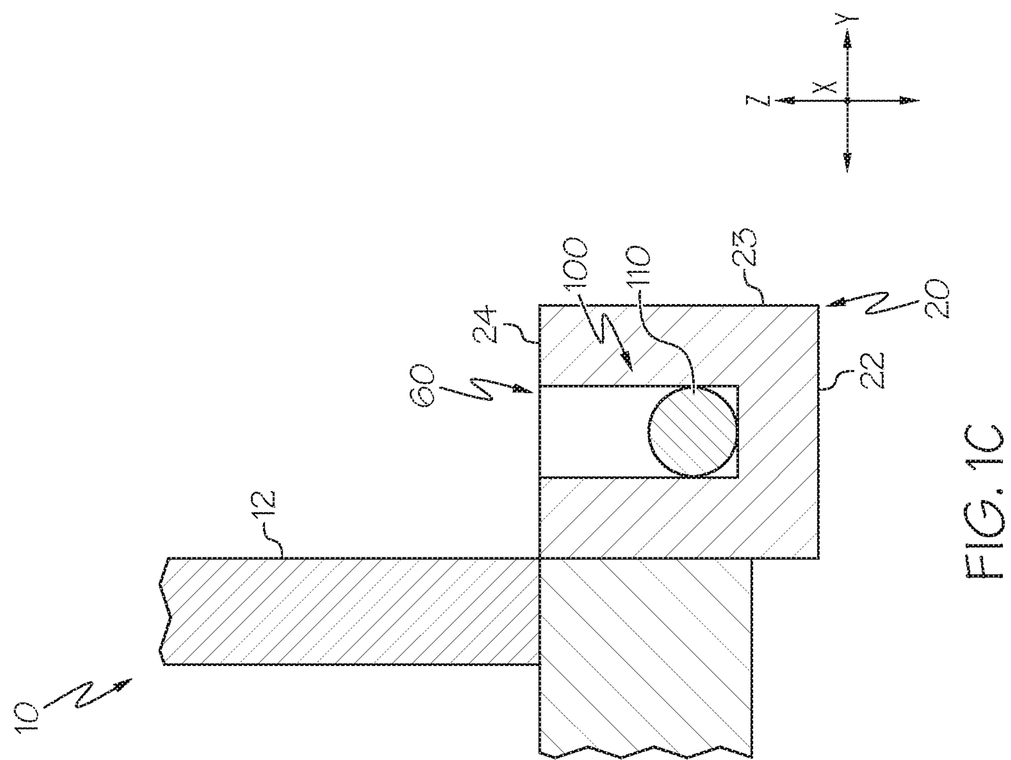
FIG. 1C depicts a cross section of the rear bumper assembly of FIG. 1A, according to one or more embodiments shown and described herein.

FIG. 1C illustrates a cross-section of the bumper assembly 20 illustrated in FIG. 1A taken along line 1C-1C. As illustrated, the post 110 may be disposed within the channel 60. The post 110 may be secured in the channel 60 via a locking mechanism (not shown). The locking mechanism may be any mechanism configured to hold the stowable lighting assembly 100 in the stowed position. For example, a locking mechanism may include a particular fit between the post 110 and the channel 60. The fit between the post 110 and the channel 60 may be, for example, a press-fit or interference-fit whereby friction between the channel 60 and the post 110 secures the post 110 in place. However, other locking mechanisms are contemplated and possible (e.g., locking tabs, brackets, pins, friction within the bumper pivot connection 28, etc.).

The vehicle 10 may include a tail gate 12 that passes over (e.g., lies over, swings past, etc.) the bumper 22 when moving between an open and closed position. Such movement between the open and closed position of the tail gate 12 define a tail gate path 14. As shown in FIG. 1B, when the stowable lighting assembly 100 is moved to the deployed position, the stowable lighting assembly 100 may be positioned outside of the tail gate path 14 so as not to hinder operation of the tail gate 12 while the stowable lighting assembly 100 is deployed. Similarly, when in the stowed position, the stowable lighting assembly 100 may also be positioned outside of the tail gate path 14 so as not to hinder operation of the tail gate 12.

Figure 2A:
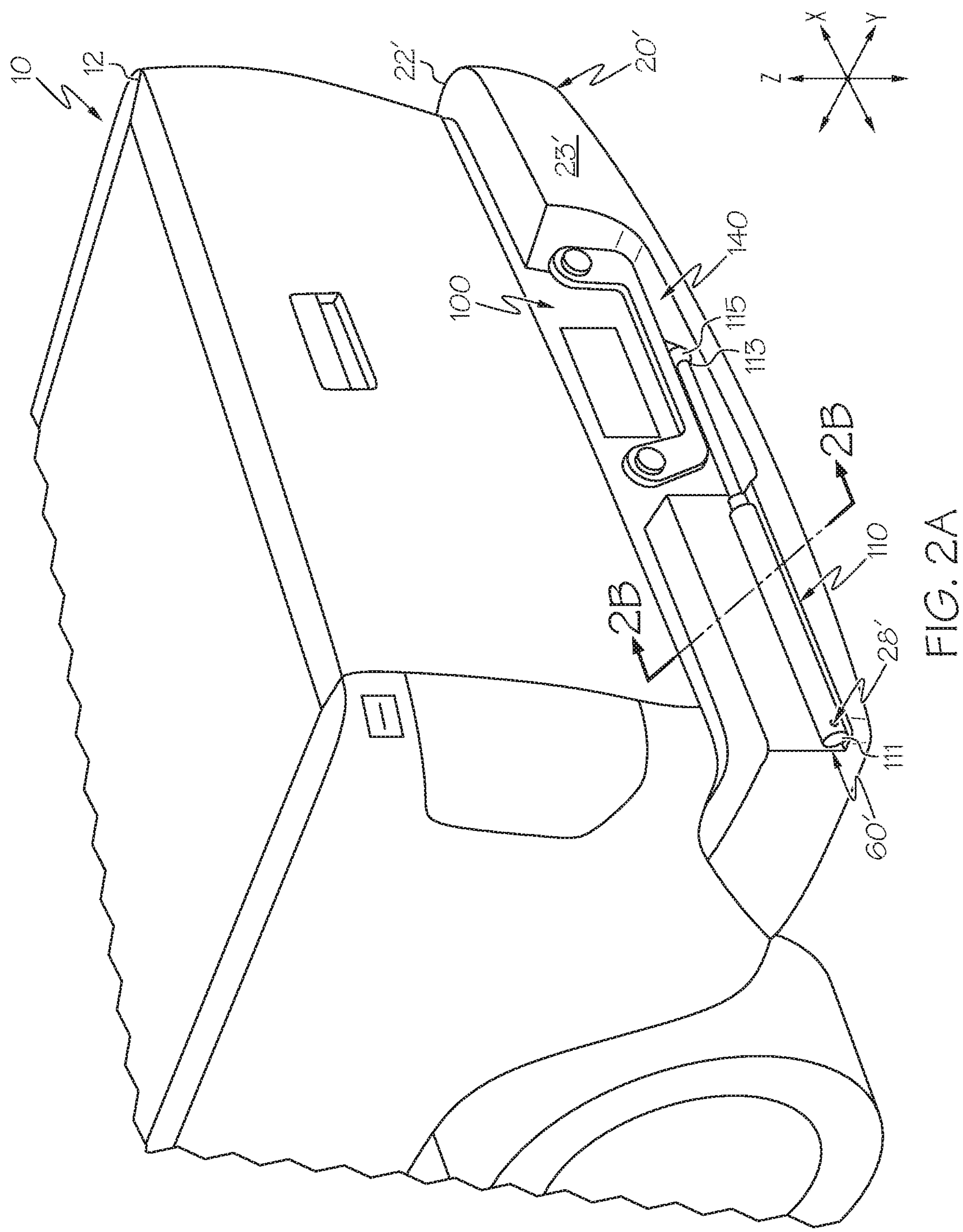
FIG. 2A depicts a perspective view of a rear bumper assembly of a vehicle with a stowable lighting assembly positioned in a stowed position, according to one or more embodiments shown and described herein.
Figure 2B:
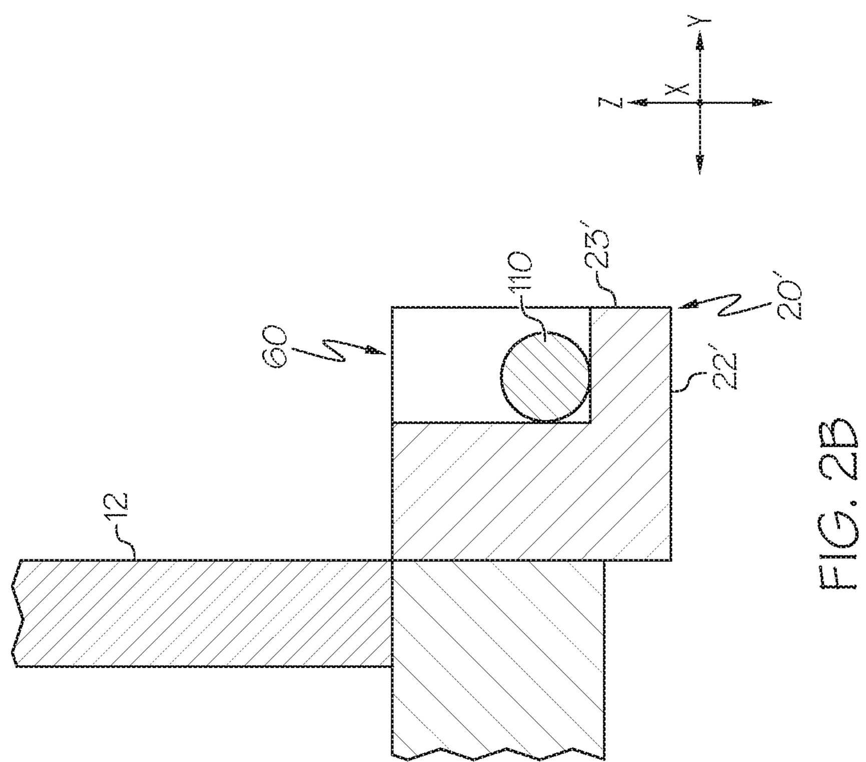
FIG. 2B depicts a cross section of the rear bumper assembly of FIG. 2A, according to one or more embodiments shown and described herein.

FIGS. 2A and 2B illustrate an alternative embodiment of a bumper assembly 20'. In this embodiment, a channel 60' may be configured as a ledge or cutout within the laterally extending surface 23' of the bumper 22'. Accordingly, in this embodiment, the post 110 of the stowable lighting assembly 100 may be visible when positioned in the stowed position and viewed along the vehicle longitudinal direction. Again, the post 110 may be locked in the stowed position through a variety of mechanisms including but not limited to, straps, pins, friction within the bumper pivot connection 28', etc.

Figure 3A:
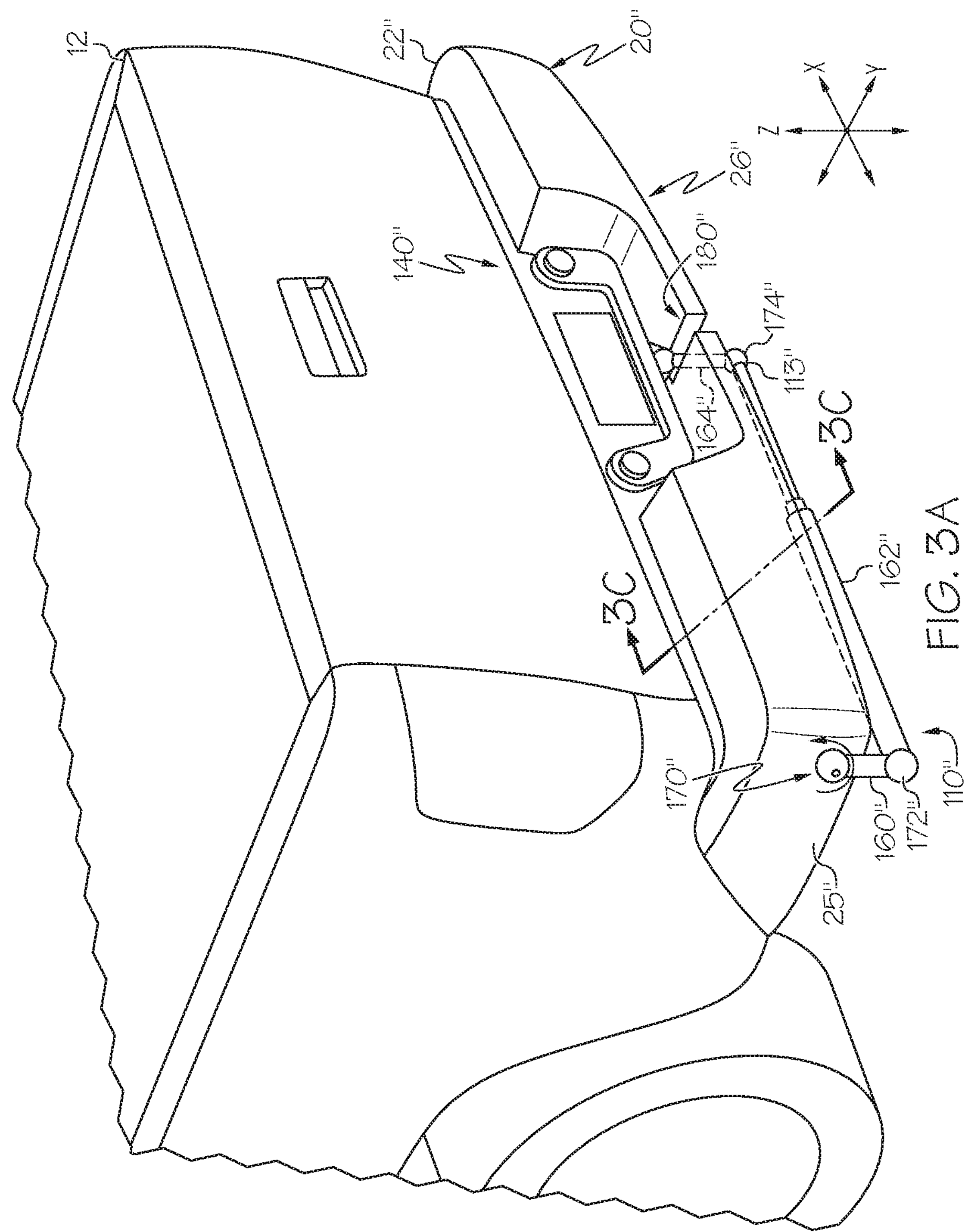
FIG. 3A depicts a perspective view of a rear bumper assembly of a vehicle with a stowable lighting assembly positioned in a stowed position, according to one or more embodiments shown and described herein.
Figure 3B:
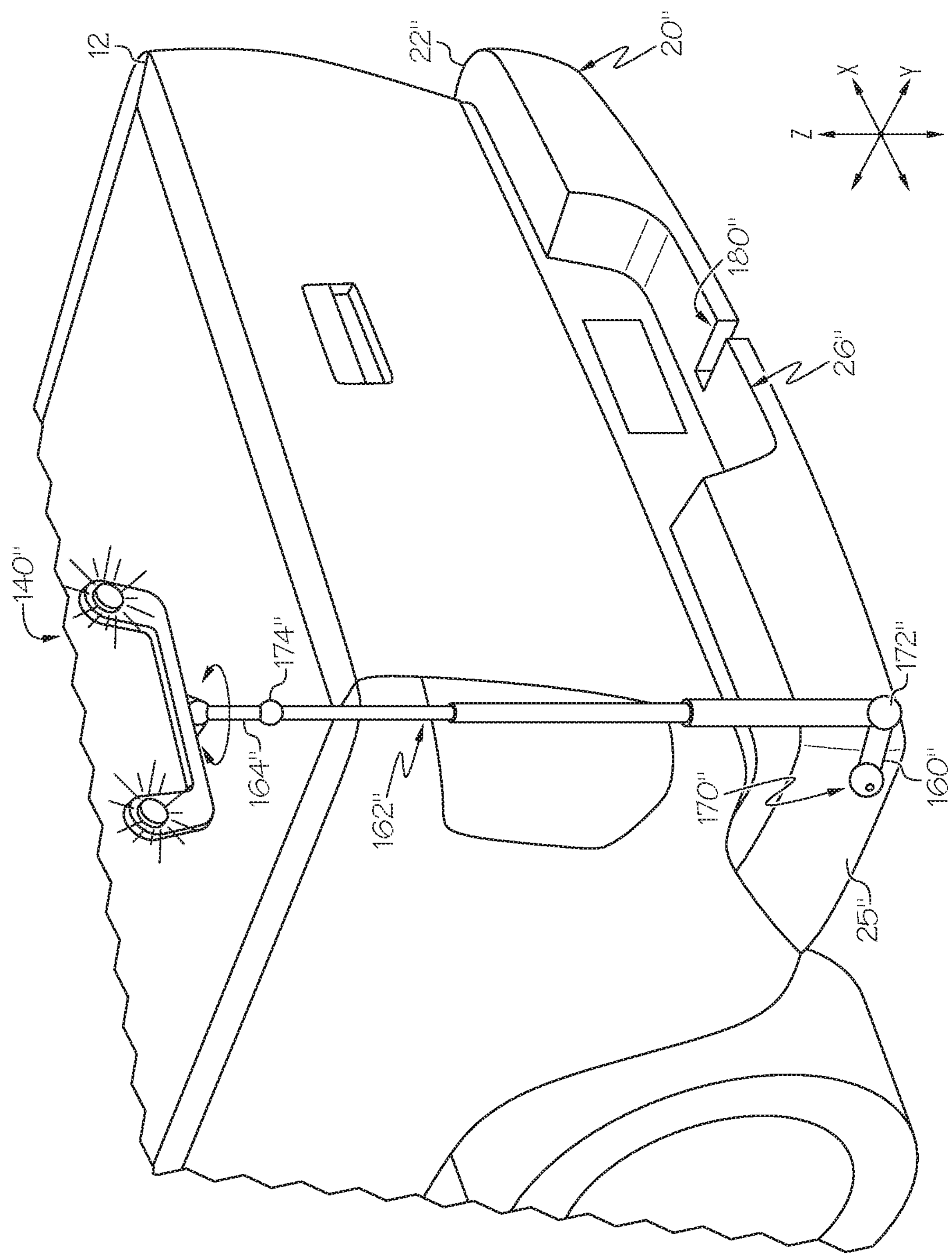
FIG. 3B depicts the stowable lighting assembly of FIG. 3A deployed to a deployed position, according to one or more embodiments shown and described herein.
Figure 3C:
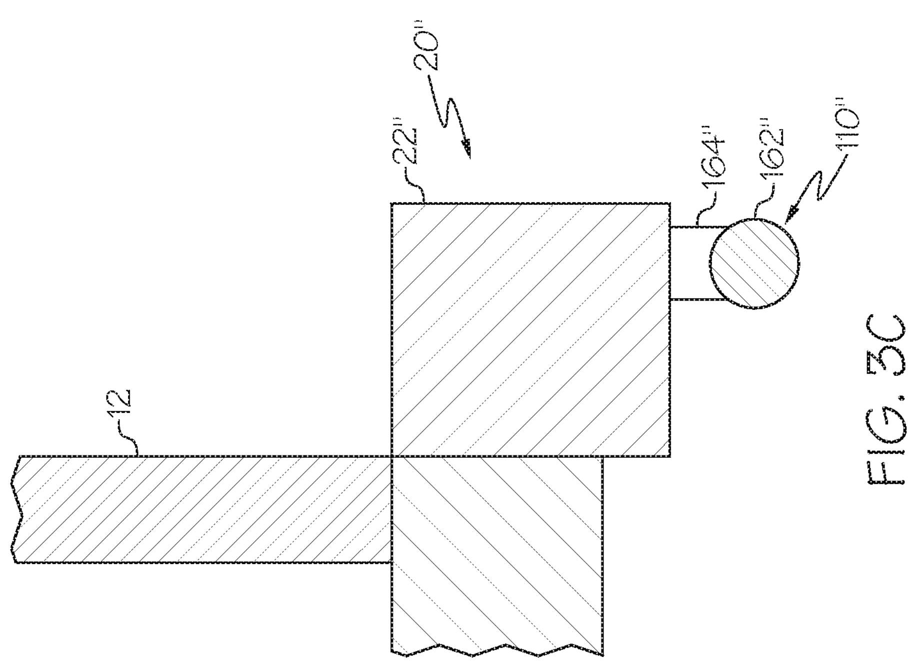
FIG. 3C depicts a cross section of the rear bumper assembly of FIG. 3A, according to one or more embodiments shown and described herein.

FIGS. 3A-3C illustrate another alternative embodiment of the bumper assembly 20". In this embodiment, the stowable lighting assembly 100" is stowed at least partially beneath the bumper 22" in the vehicle vertical direction. For example, and as shown, at least a portion of the post 110" is folded and positioned beneath the bumper 22". To facilitate folding of the post 110" beneath the bumper 22", the post 110" may be pivotably coupled to a side surface 25" of the bumper 22" at a first joint location 170" (e.g., via a pin connection or the like). The post 110" may include a base support portion 160" coupled to the side surface 25" of the bumper 22" at the first joint location 170". The post 110 may include a middle support portion 162" pivotably coupled to a free end of the base support portion 160" at a second joint location 172". For example the middle support portion 162" may be pivotably coupled to the base support portion 160" via a pin, ball joint, hinge, or the like. The middle support portion 162" may be substantially identical to the post 110 described in regards to FIGS. 1A-1C.

As an example, to move the stowable lighting assembly 100" from the stowed position illustrated in FIG. 3A to the deployed position illustrated in FIG. 3B, the middle support portion 162" may be rotated through the X-Y plane of the depicted coordinate axes at the second joint location 172". Once at a position generally parallel to the vehicle longitudinal direction, the base support portion 160" and the middle support portion 162" may be together rotated about the first joint location 170" through the Y-Z plane of the depicted coordinate axes until the middle support portion 162" is substantially parallel to the vehicle vertical direction. In some embodiments, both the base support portion 160" and the middle support portion 162" may be positioned so as to be parallel to the vehicle vertical direction.

At a distal end 113" of the middle support portion 162" may be a third joint location 174" that pivotably couples the middle support portion 162" to an upper support portion 164". Pivotably coupled at a distal end of the upper support portion 164" may be the lighting device 140", which is identical in structure to lighting device 140 as described herein. As shown in FIGS. 3A and 3B, the bumper 22" may include a vertical channel 180" that cuts through a body of the bumper 22" to the license plate recess 26". As illustrated, when in the stowed position the upper support portion 164" may be rotated about the third joint location 174" to place the upper support portion 164" within the vertical channel 180" such that the lighting device 140 is disposed within the license plate recess 26", as discussed above.

FIG. 4 schematically illustrates a lighting control system 200 for controlling the lighting device 140" of the stowable lighting assembly 100. The lighting control system 200 may include a communication path 202, an electronic control unit 201, one or more position sensors 210, one or more user input devices 220, and the stowable lighting assembly 100. In some embodiments, the lighting control system 200 may further include network interface hardware 240, one or more additional vehicle lights 18, and one or more vehicle status sensors 212. The lighting control system 200 may be fully integrated into the vehicle's operating system or separate therefrom.

As noted above, the lighting control system 200 includes a communication path 202 that provides data interconnectivity between various modules disposed within the lighting control system 200. Specifically, each of the modules can operate as a node that may send and/or receive data. In some embodiments, the communication path 202 includes a conductive material that permits the transmission of electrical data signals to processors 204, memories, sensors, and actuators throughout the lighting control system 200. In another embodiment, the communication path 202 can be a bus, such as for example a LIN bus, a CAN bus, a VAN bus, and the like. In further embodiments, the communication path 202 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The electronic control unit 201 may include one or more processors 204 communicatively coupled with one or more memory modules 206. The one or more processors 204 may include any device capable of executing machine-readable instructions stored on a non-transitory computer-readable medium. Accordingly, each processor may include a controller, an integrated circuit, a microchip, a computer, and/or any other computing device.

The one or more memory modules 206 are communicatively coupled to the one or more processors 204 over the communication path 202. The one or more memory modules 206 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within system and/or external to the lighting control system 200. The one or more memory modules 206 may be configured to store one or more pieces of logic, as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail, the logic stored on the one or more memory modules 206, when executed by the one or more processors 204 causes the illumination pattern of the stowable lighting assembly 100 to be adjusted (e.g., changing a direction of illumination, a brightness of illumination, and the like).

As noted above the lighting control system 200 may include one or more position sensors 210 communicatively coupled to the electronic control unit 201 over the communication path 202. The one or more position sensors 210 may be configured to output a position signal indicative of a position of the stowable lighting assembly 100. For example, the one or more position sensors 210 may include, pressure sensors, switches, optical sensors, proximity sensors, or the like. Based on the position signal, the electronic control unit 201 may be operable to determine a position of the stowable lighting assembly 100. For example, one or more pressure sensors may be coupled to the above described channel 60 (illustrated in FIGS. 1A-1C), wherein when the post 110 of the stowable lighting assembly 100 is stowed within the channel 60, the post 110 contacts the pressure sensor causing the pressure sensor to output a signal indicative of the post 110 being positioned within the channel 60. The electronic control unit 201 may accordingly, determine based on the position signal that the stowable lighting assembly 100 is positioned in the stowed position. Similarly, if the one or more pressure sensors output a signal indicative of no pressure acting on the one or more pressure sensors, the electronic control unit 201 may determine that the stowable lighting assembly 100 is positioned in the deployed position. As noted herein, the electronic control unit 201 may be operable to adjust the illumination pattern of the lighting device 140 in response to determining the position of the stowable lighting assembly 100.

As noted above, communicatively coupled to the electronic control unit 201 over the communication path 202 may be the one or more user input devices 220. The one or more user input devices 220 may include tactile input hardware (e.g., joystick, knob, lever, button, etc.) that allows an operator to input commands into the electronic control unit 201 to control operation of the stowable lighting assembly 100. As illustrated in FIG. 1A, the one or more user input devices 220 may be coupled to the vehicle 10 at a location proximate to the stowable lighting assembly 100. In some cases, the one or more user input devices 220 may be coupled directly to the stowable lighting assembly 100 (e.g., the lighting device 140 or the post 110). The one or more user input devices 220 may allow a user to input lighting preferences including, for example, brightness, particular illumination patterns, color, etc.

In some embodiments, the one or more user input devices 220 may include a remote device 218 (smartphone, laptop, tablet, etc.) communicatively coupled to the stowable lighting assembly 100 through network interface hardware 240. The network interface hardware 240 may be any device capable of transmitting and/or receiving data via a network 215. Accordingly, network interface hardware 240 can include a communication transceiver for transmitting and/or receiving any wireless communication. For example, the network interface hardware 240 may include an antenna, Wi-Fi card, WiMax card, mobile communications hardware, near-field communication hardware, satellite communication hardware and/or any wireless hardware for communicating with other networks and/or devices (e.g., hardware for communicating via a Bluetooth or 5G connection). In one embodiment, network interface hardware 240 includes hardware configured to operate in accordance with the Bluetooth wireless communication protocol. In another embodiment, network interface hardware 240 may include a Bluetooth send/receive module for transmitting and receiving Bluetooth communications to/from a network 215. As noted above, the network interface hardware 240 may allow the various components of the lighting control system 200 to communicate with a remote device 218 (e.g., smart phone, laptop, tablet, etc.). For example, a user may use a remote device 218 to control the lighting system and more particularly the lighting device 140 of the stowable lighting assembly 100. For example, a user may adjust an illumination pattern (e.g., lighting direction, color, and/or intensity) using an application on a smartphone.

As noted above, the various modules of the lighting control system 200 includes the stowable lighting assembly 100. Referring to FIG. 5, the stowable lighting assembly 100 is illustrated in the stowed position according to one or more embodiments. In the illustrated embodiment, when in the stowed position, the lighting device 140 is positioned within the bumper 22 recess such that a lamp 152A, 152B is position to either side of the license plate mounting position 30. As noted herein, the illumination pattern of the lamps 150 may be adjusted. For example, when in the stowed position, it may be desired for the lighting device 140 to illuminate a license plate 32 mounted to the license plate mounting position 30. In one embodiment, each lamp 150 may include multiple bulbs or light sources that are configured to direct light in various directions. For example, the lamps 150 may include dedicated bulbs (e.g., bulb 154) configured to direct light in a lateral direction toward the license plate 32 mounting position, when the stowable lighting assembly 100 is positioned in the stowed position.

As an example, when the electronic control unit 201, based on the position signal output by the one or more position sensors 210, determines that the stowable lighting assembly 100 is in the stowed position, the electronic control unit 201 may automatically actuate the lighting device 140 so that the light sources configured to direct light toward the license plate mounting position 30, are activated. Windows 158 within the housing 142 may allow light from the light sources to be directed through the housing 142 to the license plate mounting position 30. When in the deployed position, such as illustrated in FIG. 1B, the electronic control unit 201, based on the position signal output by the one or more position sensors 210, may determine that the stowable lighting assembly 100 is in a deployed position and may automatically configure the light sources to direct light in a main lighting direction (e.g., perpendicular to a front surface 141 of the housing 142). That is, the electronic control unit 201 may adjust the illumination pattern of the lighting device 140 from a first direction associated with the stowed position to a second direction associated with the deployed position when it is determined, based on the position signal output by the one or more position sensors 210, that the stowable lighting assembly 100 is in the deployed position.

Referring again to FIG. 4, as noted herein the lighting control system 200 may further include additional vehicle lights 18 that are communicatively coupled to the electronic control unit 201 over the communication path 202. The additional vehicle lights 18 may include the vehicle brake lights, headlights, bed lights, or the like to provide additional lighting to the region of or around the vehicle 10. That is, the electronic control unit 201 may be configured to actuate additional vehicle lights 18 automatically, based on user defined preferences stowed within the one or more memory modules 206, and/or entered using the one or more user input devices 220.

In some embodiments, the vehicle 10 may include a vehicle status sensor 212 which outputs a status signal indicative of a driving status of the vehicle 10. Such driving statuses may include on, off, in drive, in reverse and the like. The vehicle status sensor 212 may be any sensor capable of outputting a status signal indicative of the status of the vehicle 10 (e.g., an ignition sensor, drive mode sensor, etc.). In embodiments, based on the status signal output by the vehicle status sensor 212, the lighting control system 200 may automatically adjust the illumination pattern of the lighting device 140. For example, when the vehicle 10 is on and it is detected that the stowable lighting assembly 100 is positioned in the stowed position, the pattern of illumination of the lighting device 140 may be adjusted to be directed toward the license plate 32 mounting position to illuminate a mounted license plate 32. In some embodiments, when it is determined, based on the status signal, that the vehicle 10 is in reverse and it is determined the the stowable lighting assembly 100 is in the stowed position, the pattern of illumination of the lighting device 140 may be adjusted to the main lighting direction to provide greater back-up lighting.

It should now be understood that vehicles and bumper assemblies as herein include a stowable lighting assembly. The stowable lighting assembly may include a post that is pivotably coupled to a bumper of a vehicle and a lighting device pivotably coupled to the end of the post. The stowable lighting assembly may be moveable between a stowed position and a deployed position. In the stowed position, the lighting assembly may be folded so as to be stored under or within the bumper. Accordingly, the lighting assembly may be stowed without taking up additional storage space within a cabin, trunk, or bed of the vehicle. Additionally, in embodiments, the lighting device may double as a license plate lights, to provide illumination to the license plate 32 of the vehicle 10 when the lighting device is placed in a stowed configuration.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper assembly, comprising:

a bumper defining a license plate recess configured to have a license plate mounted therein; and a stowable lighting assembly comprising:

a post comprising a proximal end and a distal end, wherein the proximal end is pivotably coupled to the bumper; and a lighting device pivotably coupled to the distal end of the post, wherein the stowable lighting assembly is moveable between a stowed position and a deployed position, wherein the post is positioned within or beneath the bumper in the stowed position, and the lighting device, when in the stowed position, is disposed in the license plate recess.

2. The bumper assembly of claim 1, further comprising:

an electronic control unit communicatively coupled to the lighting device;

one or more position sensors communicatively coupled to the electronic control unit and configured to output a position signal indicative of a position of the stowable lighting assembly, wherein:

the electronic control unit is operable to determine the position of the stowable lighting assembly based on the position signal from the one or more position sensors and adjust an illumination pattern of the lighting device in response to determining the position of the stowable lighting assembly.

3. The bumper assembly of claim 2, wherein:

the electronic control unit adjusts the illumination pattern of the lighting device to illuminate a license plate mounting position when the electronic control unit determines based on the position signal output by the one or more position sensors that the stowable lighting assembly is in the stowed position.

4. The bumper assembly of claim 2, wherein:

the electronic control unit adjusts the illumination pattern of the lighting device from a first direction associated with the stowed position to a second direction associated with the deployed position when the electronic control unit determines based on the position signal output by the one or more position sensors that the stowable lighting assembly is in the deployed position.

5. The bumper assembly of claim 1, wherein the lighting device comprises a generally u-shaped housing comprising:

a base portion, a first extending portion coupled to a first end of the base portion and a second extending portion coupled to a second end of the base portion; and a first lamp coupled to the first extending portion and a second lamp coupled to the second extending portion.

6. The bumper assembly of claim 1, wherein the post is a telescoping post.

7. The bumper assembly of claim 1, further comprising:

one or more hangers pivotably coupled to the post and moveable between a hanger stowed position and a hanger deployed position, wherein the post comprises one or more hanger recesses wherein the one or more hangers are positioned within the one or more hanger recesses when the one or more hangers are positioned in the hanger stowed position.

8. A bumper assembly, comprising:

a bumper defining a channel formed therein and defining a license plate recess configured to have a license plate mounted therein; and a stowable lighting assembly comprising:

a post comprising a proximal end and a distal end, wherein the proximal end is pivotably coupled to the bumper; and a lighting device pivotably coupled to the distal end of the post, wherein the stowable lighting assembly is moveable between a stowed position and a deployed position and, wherein the post of the stowable lighting assembly is arranged in the channel when the stowable lighting assembly is positioned in the stowed position, and the lighting device, when in the stowed position, is disposed in the license plate recess.

9. The bumper assembly of claim 8, further comprising:

an electronic control unit communicatively coupled to the lighting device;

one or more position sensors communicatively coupled to the electronic control unit and configured to output a position signal indicative of a position of the stowable lighting assembly, wherein the electronic control unit is operable to determine the position of the stowable lighting assembly and adjust an illumination pattern of the lighting device in response to determining the position of the stowable lighting assembly.

10. The bumper assembly of claim 9, wherein:

the electronic control unit adjusts the illumination pattern of the lighting device to illuminate a license plate mounting position when the electronic control unit determines based on the position signal output by the one or more position sensors that the stowable lighting assembly is in the stowed position.

11. The bumper assembly of claim 9, wherein:

the electronic control unit adjusts the illumination pattern of the lighting device from a first direction associated with the stowed position to a second direction associated with the deployed position when the electronic control unit determines based on the position signal output by the one or more position sensors that the stowable lighting assembly is in the deployed position.

12. The bumper assembly of claim 8, wherein the lighting device comprises a generally u-shaped housing comprising:

a base portion, a first extending portion coupled to a first end of the base portion and a second extending portion coupled to a second end of the base portion; and a first lamp coupled to the first extending portion and a second lamp coupled to the second extending portion.

13. The bumper assembly of claim 8, wherein the post is a telescoping post.

14. The bumper assembly of claim 8, further comprising:

one or more hangers pivotably coupled to the post and moveable between a hanger stowed position and a hanger deployed position, wherein the post comprises one or more hanger recesses wherein the one or more hangers are positioned within the one or more hanger recesses when the one or more hangers are positioned in the hanger stowed position.

15. A vehicle, comprising:

a bumper defining a license plate recess configured to have a license plate mounted therein;

a tail gate configured to move between an open and closed position, wherein movement between the open and closed position defines a tail gate path, and a stowable lighting assembly comprising:

a post comprising a proximal end and a distal end, wherein the proximal end is pivotably coupled to the bumper; and a lighting device pivotably coupled to the distal end of the post, wherein the stowable lighting assembly is moveable between a stowed position and a deployed position, wherein the post is positioned within or beneath the bumper when in the stowed position and the stowable lighting assembly is positioned outside of the tail gate path when in the deployed position, and the lighting device, when in the stowed position, is disposed in the license plate recess.

16. The vehicle of claim 15, further comprising:

an electronic control unit communicatively coupled to the lighting device;

one or more position sensors communicatively coupled to the electronic control unit and configured to output a position signal indicative of a position of the stowable lighting assembly, wherein the electronic control unit is operable to determine the position of the stowable lighting assembly and adjust an illumination pattern of the lighting device in response to determining the position of the stowable lighting assembly.

17. The vehicle of claim 16, wherein:

the electronic control unit adjusts the illumination pattern of the lighting device to illuminate a license plate mounting position when the electronic control unit determines based on the position signal output by the one or more position sensors that the stowable lighting assembly is in the stowed position.

18. The vehicle of claim 16, wherein:

the electronic control unit adjusts the illumination pattern of the lighting device from a first direction associated with the stowed position to a second direction associated with the deployed position when the electronic control unit determines based on the position signal output by the one or more position sensors that the stowable lighting assembly is in the deployed position.

* * * * *

UNITED STATES PATENT AND TRADEMARK OFFICE

CERTIFICATE OF CORRECTION

PATENT NO. : 10,829,035 B2
APPLICATION NO. : 16/259343
DATED : November 10, 2020
INVENTOR(S) : Winston Robertson It is certified that error appears in the above-identified patent and that said Letters Patent is hereby corrected as shown below:

In the Specification

In Column 4, Line(s) 8, delete "positon" and insert --position--, therefor.

In Column 10, Line(s) 7, before "the stowable", delete "the" and insert --that--, therefor.

Signed and Sealed this
Twenty-ninth Day of December, 2020

Andrei Iancu
*Director of the United States Patent and Trademark Office*